United States Patent

[11] 3,584,747

| [72] | Inventors | Philip Norman Ekelund;<br>Richard E. Cummings, both of Cottage Grove, Oreg. |
|---|---|---|
| [21] | Appl. No. | 846,330 |
| [22] | Filed | July 31, 1969 |
| [45] | Patented | June 15, 1971 |
| [73] | Assignee | Georgia-Pacific Corporation<br>Portland, Oreg.<br>Continuation-in-part of application Ser. No. 825,849, May 19, 1969, now abandoned. |

[54] LINE SHORTENER FOR GRAPPLE LOG-YARDING APPARATUS
7 Claims, 7 Drawing Figs.

[52] U.S. Cl. .................................................. 212/84,
212/89, 212/81, 254/189
[51] Int. Cl. .................................................. B66c 19/00
[50] Field of Search .......................................... 212/89, 81,
84, 90, 97; 254/189

[56] References Cited
UNITED STATES PATENTS

| 3,309,065 | 3/1967 | Prud'Homme | 254/189 |
| 3,407,942 | 10/1968 | McIntrye | 212/89 |
| 3,502,535 | 3/1970 | Bongers | 254/189 |

FOREIGN PATENTS

| 6,514,509 | 5/1967 | Netherlands | 212/81 |

Primary Examiner—Harvey C. Hornsby
Attorney—Eugene D. Farley

ABSTRACT: A line shortener for grapple log-yarding apparatus comprises at least three line guides in series engagement with a deflection segment of a grapple-supporting yarding line. The intermediate guide lines on one side, the two outer guides on the other side, of the line. A reciprocating drive reciprocates the intermediate guide between advanced and retracted positions which lie, respectively, in front of and behind the outer guides. This alternately shortens and lengthens the line and works the grapple.

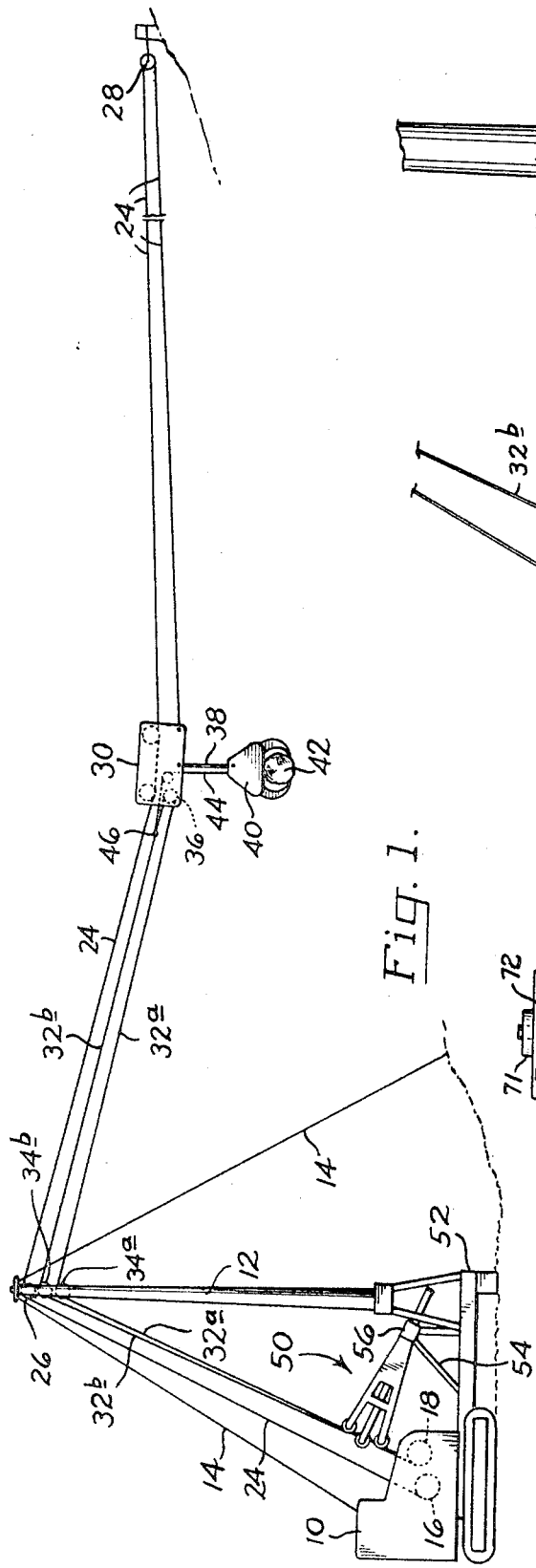
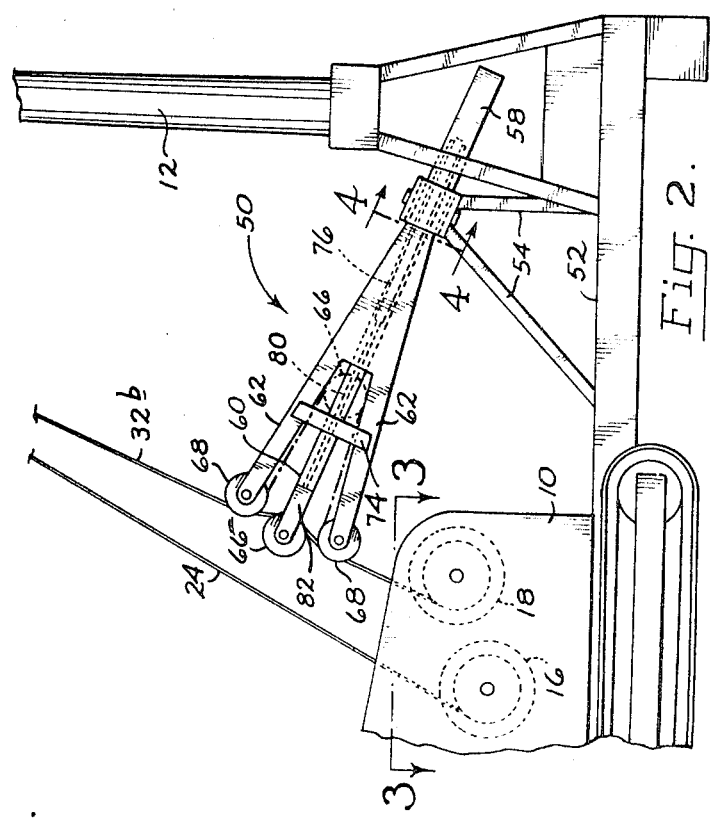
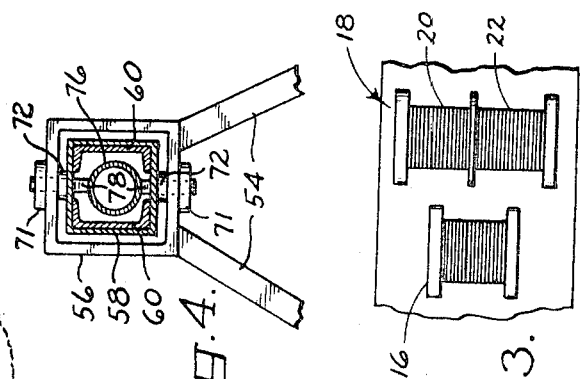
Phillip N. Ekelund
Richard E. Cummings
INVENTORS
BY *Eugene O. Farley*
Atty.

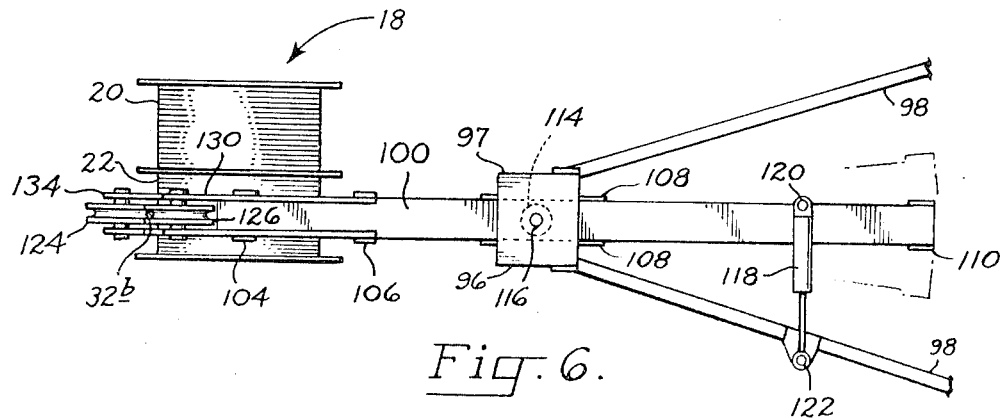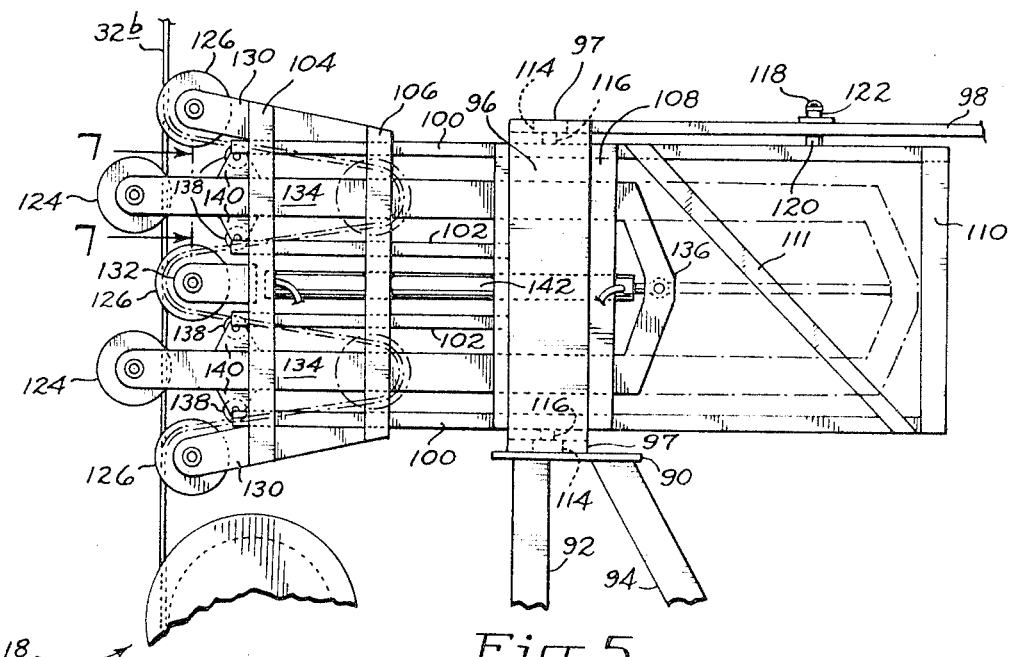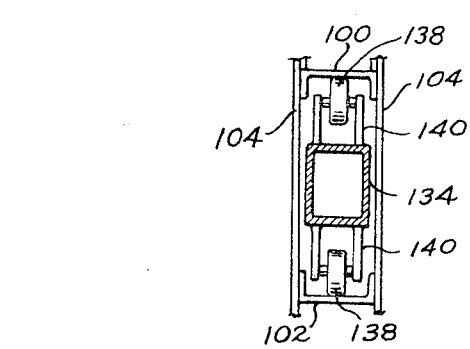

LINE SHORTENER FOR GRAPPLE LOG-YARDING APPARATUS

This application is a continuation-in-part of the application of Philip N. Ekelund and Richard E. Cummings, Ser. No. 825,849, filed May 19, 1969, now abandoned, for Line Shortener for Grapple Log Yarding Apparatus.

This invention relates to a line shortener for grapple log-yarding apparatus.

In the drawings:

FIG. 1 is a schematic view of grapple log-yarding apparatus incorporating the presently described line length altering component;

FIG. 2 is a fragmentary enlarged view in side elevation showing in greater detail the manner of application of the yarding line length altering component to the yarding apparatus;

FIG. 3 is a fragmentary detail view in plan looking in the direction of the arrows of line 3-3 in FIG. 2 and illustrating the arrangement of a drum component employed in the yarding apparatus;

FIG. 4 is a transverse sectional view taken along line 4-4 of FIG. 2;

FIG. 5 is a view in side elevation, similar to FIG. 2, of the yarding line length altering component in a second embodiment;

FIG. 6 is a view in plan of the embodiment of FIG. 5; and

FIG. 7 is a detail sectional view taken along line 7-7 of FIG. 5.

Typical grapple log-yarding apparatus of the class on which the present invention may be employed is illustrated in FIG. 1.

A large tractor or other substantial vehicle 10 mounts a mobile spar pole 12 supported during operation by the usual guy lines 14. The tractor also mounts an outhaul line drum 16 and an inhaul line drum 18. The latter comprises two spools 20, 22 fixed to a common shaft, and rotating together. Drums 16, 18 are powered and provided with clutches and brakes of suitable design.

Outhaul line drum 16 feeds an outhaul line or cable 24. This line passes from the drum, over an outhaul line block 26, and around a tail block 28 secured to a stump or other support. Its outer end is fixed to a carriage 30 which is supported by and rides along the outhaul line in a linear path between the landing area at which tractor 10 is located and the remote area at which tail block 28 is located.

Inhaul drum 18 works a divided inhaul line or cable, the two sections of which are indicated at 32a and 32b. The two sections pass over inhaul line blocks 34a and 34b on the top of spar pole 12.

The inhaul line further is reeved about a pulley 36 rotatably mounted on the near side of carriage 30. Carriage 30 supports by means of a swiveled connector 38, a grapple 40 designed to engage one or more logs 42 as they lie on the ground. The grapple may be variously designed, but normally comprises one in which the jaws are opened mechanically and closed gravitationally.

To this end there is provided a tag line 44, one end of which is secured to inhaul line 32b by means of a connector 46 and the other end of which is connected to the mechanism of grapple 40.

In the operation of grapple log-yarding apparatus of the class described above, outhaul line drum 16 is activated to shorten outhaul line 24. At the same time inhaul line drum 18 is released to permit simultaneous unwinding of the inhaul line segments 32a, 32b.

At the log location, outhaul line 24 is slacked off.

The length of inhaul line 32b then is shortened by means of a unit 50 to be described later. This in turn actuates tag line 44 which is connected to this segment of the inhaul line, operates the grapple and causes the grapple jaws to gravitate, or be driven, to their open position in which they are lowered over the selected log or logs. Reverse actuation of unit 50 then closes the grapple jaws.

Thereafter, with the line length altering apparatus 50 still in the grapple-closed position, inhaul line drum 18 is wound in, while outhaul drum 16 is released and braked. This causes elevation of carriage 30 and of the grapple with engaged log. It simultaneously moves the carriage-grapple assembly in the direction of the landing.

When the assembly has reached the landing adjacent tractor 10, inhaul line length altering component 50 again is actuated to shorten the length of inhaul line component 32b. This may be done with or without lowering the carriage assembly. In either case the arms of grapple 40 are separated, releasing the log. The sequence then is repeated as often as necessary to clear of logs the area between the landing and stump, after which the outhaul and inhaul lines are reset over another area.

With the exception of the herein described line shortener, the foregoing apparatus and system presently are known and employed widely in the yarding of logs. It is the object of the present invention to provide such a unit of improved character in that it is more positive in action, simple in construction, durable in use, and more responsive to the demands of the operation than are the similar units of the prior art.

The construction of the improved inhaul line shortener is shown in FIGS. 2 and 4.

The unit is suitably mounted on a platform 52 and supported on legs 54. The legs support a housing 56 which in turn contains the hollow shank 58 of a trifurcated arm assembly including an inner arm 60 bracketed by a pair of outer arms 62. Inner arm 60 may comprise a pair of oppositely directed interconnected, spaced channel members slidably contained in hollow guide 58.

At their outer ends, inner arm 60 mounts a shiftable pulley 66 and outer arms 62 mount companion stationary pulleys 68. All three pulleys serve as guides for inhaul line 32b, engaging a deflection segment of the same in series relationship to each other.

It is to be observed, however, that intermediate pulley 66 is mounted on the opposite side of line 32b from outer pulleys 68.

The entire assembly is mounted for oscillating movement in a horizontal plane as required by the spooling of the line on drum 18. To this end case 56 mounts a pair of oppositely placed bearings 71 which receive stub shafts 72. The shafts support guide 58, thereby permitting limited oscillation of the assembly.

Inner arm 60 is guided in part by guide 58 and in part by a pair of plates 74 applied transversely of all three arms. It accordingly is free to reciprocate in the direction of its longitudinal axis.

A preferred means for securing the longitudinal reciprocation of the arm comprises a fluid operated cylinder, preferably a double acting hydraulic cylinder 76 received within arm 58. It is supported in spaced relation from the containing sidewalls by means of spacing supports 78. These penetrate the gap present between the channel members comprising arm 60.

The end of piston rod 80 of the cylinder is coupled to a head 82 which rotatably mounts intermediate pulley 66.

In the operation of the unit, retraction of the cylinder retracts pulley 66 so that it lies behind stationary pulleys 68, thereby shortening inhaul line 32b. Extension of the cylinder moves pulley 66 in the direction of pulleys 68 and lengthens inhaul line 32b correspondingly.

In certain installations, it may be desirable to make the inner arm stationary and the outer arms reciprocatable relative thereto, or to mount cylinder 76 for retracting pulley 66 upon extension of the cylinder, or to make the grapple responsive to the line-lengthening cycle, rather than the line shortening cycle, of the apparatus. In all of these circumstances, the alteration of the line length may be employed to advantage in actuating grapple 40 in the manner above described.

In any case, the extent of line shortening and extension is determined by the stroke of the cylinder. If in certain instances a greater degree of line length alteration is required, this may be accomplished easily by applying two or more of the line shortening components. Thus, two reciprocating arms 60 may be interleaved between three stationary arms 62 and so on, until the desired line shortening effect is obtained. Such a construction is illustrated in the embodiment of FIGS. 5, 6 and 7.

In the five-arm unit illustrated in FIGS. 5—7, a platform 90 is supported on legs 92, 94. The platform in turn supports a pair of horizontally spaced, vertically arranged structural sideplates 96 and end plates 97. These are braced by braces 98.

Plates 96 pivotally mount a frame comprised of vertically spaced, longitudinally extending, horizontal members 100, 102 tied together by horizontally spaced, vertical, crossmembers 104, 106, 108, 110 and diagonal braces 111.

Longitudinal members 100, 102 comprise channel irons arranged facing each other to provide two longitudinal tracks, the purpose of which will appear hereinafter.

Means are provided for pivotally mounting for horizontal oscillation a frame comprised of the foregoing members.

To this end the housing supported on platform 90 and consisting of sideplates 96 and end plates 97 is fitted with a pair of bearings 114, one being in each end plate. These journal pins 116 mounted upon, and extending outwardly from, framing track members 100.

The frame pivotally mounted within the housing thus is capable of restricted angular movement in a horizontal plane, as illustrated in FIG. 6. This is necessary to permit spooling of cable 32b on drum 22 during operation of the device.

The oscillatory movement of the frame is controlled and made uniform by suitably applied snubbing means. In the illustrated form of the invention such means comprise an hydraulic or air snubbing cylinder 118.

The case of the cylinder pivotally is connected to a pin 120 extending upwardly from frame member 100. Its piston rod pivotally is connected to a post 122 fixed to and extending upwardly from brace 98. The frame accordingly oscillates with a predetermined, controlled motion determined by the setting of snubber cylinder 118.

The device of FIGS. 5—7 includes two shiftable pulleys 124 interleaved between three stationary pulleys 126. Shiftable pulleys 124 are located outside of cable 32b and correspond in function to shiftable pulley 66 of the embodiment of FIGS. 2 and 4. Stationary pulleys 126 are located inside cable 32b and correspond in location and function to stationary pulleys 68 of the previously described embodiment. All five pulleys engage a deflection segment of cable 32b in cable-shortening relation.

Outer stationary pulleys 126 are rotatably mounted on shafts journaled in bearings supported on brackets 130. The latter in turn are fixed to and supported by framing members 100, 104, 106.

Intermediate stationary pulley 126 is rotatably mounted on a shaft journaled in bearings carried by arms 132. The latter are fixed to, and extend outwardly from, transverse framing member 104.

Shiftable pulleys 124 are rotatably mounted on shafts received in bearings supported on the ends of a yoke-shaped, shiftable subframe slidably mounted on the main frame above described.

The subframe includes vertically spaced, horizontal beams 134, on the outer ends of which pulleys 124 are mounted, and a connecting crosspiece 136, FIG. 5.

The subframe including elements 134, 136 is supported and guided for horizontal reciprocation between its full line and dotted line positions of FIG. 5 by the framing members of the main frame.

It is supported and guided further by means of cooperating pairs of rollers 138. These are rotatably mounted on shafts supported between plates 140 carried by beams 134. Rollers 138 track in opposed pairs of horizontal track framing members 100, 102.

Reciprocation of the shiftable pulley assembly between its advanced and retracted positions is accomplished by a drive including a horizontally mounted hydraulic cylinder 142. The case of the cylinder is fixed to some or all of framing members 104, 106, 108. Its piston rod is connected to transverse member 136 of the shiftable pulley subframe.

Reciprocation of the cylinder alternates the shiftable pulley assembly between its line-shortening and line-lengthening positions. This action may be employed to operate grapple 40 in the manner described above. However, a more positive action and control are achieved because of the multiplied effect of the alteration in cable length.

Having thus described our invention, we claim:

1. In grapple-yarding apparatus including a carriage-mounted grapple, an outhaul line connected to the carriage, and an inhaul line connected to the carriage, the grapple being operated by altering the length of the inhaul line, inhaul line length altering means comprising:
   a. a support, a main frame,
   b. at least three line guide means in series engagement with a segment of the inhaul line, and mounted on said main frame,
   c. substantially vertical pivotal mounting means mounting the main frame on the support for pivotal movement in a substantially horizontal plane,
   d. the intermediate guide means being positioned on the side of the line opposite the two outer guide means,
   e. mounting means mounting the intermediate guide means for reciprocating longitudinal movement, and
   f. reciprocating drive means connected to the intermediate guide means for reciprocating it between retracted and advanced positions relative to the outer guide means, thereby alternately shortening and lengthening the inhaul line and operating the grapple.

2. The line length altering means of claim 1 including snubbing means interconnecting the guide means and support for securing controlled pivotal movement of the former.

3. The line length altering means of claim 2 wherein the snubbing means comprises a fluid actuated cylinder.

4. In grapple-yarding apparatus including a carriage-mounted grapple, an outhaul line connected to the carriage, and an inhaul line connected to the carriage, the grapple being operated by altering the length of the inhaul line, inhaul line length altering means comprising:
   a. a support,
   b. a main frame,
   c. substantially vertical pivotal means pivotally mounting the main frame on the support for pivotal movement in a substantially horizontal plane,
   d. three spaced stationary line guide pulleys in series engagement with a deflection segment of the inhaul line and mounted on the main frame,
   e. a yolk-shaped subframe slidably mounted on the main frame with the arms of the yolk interleaved between the stationary guide line pulleys,
   f. a pair of shiftable line guide pulleys rotatably mounted on the ends of the subframe arms between the stationary line guide pulleys,
   g. the shiftable line guide pulleys being on opposite sides of the inhaul line from the stationary line guide pulleys, and
   h. reciprocating drive means interconnecting the main frame and subframe for driving the latter between advanced and retracted positions, thereby alternately shortening and lengthening the inhaul line and operating the grapple.

5. The line length altering the means of claim 4 including snubbing means interconnecting the main frame and support for securing controlled pivotal movement of the former.

6. The line length altering means of claim 5 wherein the snubbing means comprises a fluid actuated cylinder.

7. The line length altering means of claim 4 wherein the outhaul and inhaul are disposed adjacent each other and the shiftable line guide pulleys are located between the outhaul and inhaul lines.